(12) United States Patent
Jeong et al.

(10) Patent No.: US 9,312,749 B2
(45) Date of Patent: *Apr. 12, 2016

(54) DRIVER DEVICE FOR POWER FACTOR CORRECTION CIRCUIT

(71) Applicant: SAMSUNG ELECTRO-MECHANICS CO., LTD., Suwon, Gyunggi-do (KR)

(72) Inventors: In Wha Jeong, Gyunggi-do (KR); Chang Jae Heo, Gyunggi-do (KR); Bum Seok Suh, Gyunggi-do (KR); Jae Hyun Lim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 106 days.

This patent is subject to a terminal disclaimer.

(21) Appl. No.: 14/095,664

(22) Filed: Dec. 3, 2013

(65) Prior Publication Data

US 2014/0153307 A1 Jun. 5, 2014

(30) Foreign Application Priority Data

Dec. 5, 2012 (KR) .................. 10-2012-0140169

(51) Int. Cl.
*H02M 1/42* (2007.01)
*H02M 7/217* (2006.01)
*H02M 3/158* (2006.01)

(52) U.S. Cl.
CPC ............ *H02M 1/4225* (2013.01); *H02M 7/217* (2013.01); *H02M 3/158* (2013.01); *Y02B 70/126* (2013.01)

(58) Field of Classification Search
CPC ................ H02M 1/4225; H02M 1/44; H02M 2001/0032; H02M 2001/0058; H02M 2001/342; H02M 2003/1586; G05F 1/70
See application file for complete search history.

(56) References Cited

U.S. PATENT DOCUMENTS 6,421,263 B1 * 7/2002 Shinkawa ...................... 363/132
6,493,305 B1 * 12/2002 Hayashi et al. ............ 369/59.12

(Continued)

FOREIGN PATENT DOCUMENTS

CN 2706955 Y 6/2005
CN 101621247 A 1/2010

(Continued)

OTHER PUBLICATIONS

First Office Action Chinese Patent Application No. 201310631970.7 dated Oct. 8, 2015 with full English translation.

*Primary Examiner* — Timothy J Dole
*Assistant Examiner* — Yusef Ahmed
(74) *Attorney, Agent, or Firm* — McDermott Will & Emery LLP

(57) ABSTRACT

There is provided a driver device for a power factor correction circuit including first and second main switches that are switched on and off with a phase difference therebetween, and first and second auxiliary switches that provide conduction paths of surplus voltage in the first and second main switches before the first and second main switches are switched on, the driver device including: an input unit receiving a plurality of input signals; and an output unit outputting a first control signal for the first main switch, a second control signal for the second main switch, a third control signal for the first auxiliary switch, and a fourth control signal for the second auxiliary switch based on a plurality of input signals.

15 Claims, 12 Drawing Sheets

(56) References Cited

U.S. PATENT DOCUMENTS

| | | |
|---|---|---|
| 7,218,081 B2 | 5/2007 | Jang et al. |
| 7,279,868 B2* | 10/2007 | Lanni .................... 323/222 |
| 7,518,895 B2* | 4/2009 | Shekhawat et al. ........... 363/89 |
| 8,786,348 B2* | 7/2014 | Kawai et al. .................. 327/298 |
| 2002/0041178 A1* | 4/2002 | Hiraki et al. ................. 323/272 |
| 2005/0041440 A1 | 2/2005 | Natori |
| 2005/0201124 A1* | 9/2005 | Lanni ............................ 363/16 |
| 2006/0158159 A1* | 7/2006 | Nishimori .................... 323/222 |
| 2006/0208714 A1* | 9/2006 | Saeki et al. .................. 323/282 |
| 2006/0208715 A1* | 9/2006 | Saeki et al. .................. 323/282 |
| 2010/0097041 A1* | 4/2010 | Ayukawa et al. ............ 323/272 |
| 2011/0095740 A1* | 4/2011 | Mori et al. .................. 323/282 |
| 2011/0096577 A1* | 4/2011 | Yamada ....................... 363/44 |
| 2011/0254517 A1* | 10/2011 | Morishima et al. .......... 323/207 |
| 2011/0255311 A1* | 10/2011 | Hsu et al. .................... 363/21.15 |
| 2011/0279105 A1* | 11/2011 | Hirose .......................... 323/311 |
| 2012/0014150 A1* | 1/2012 | Domb ............................. 363/89 |
| 2012/0126769 A1* | 5/2012 | Uchiike ....................... 323/283 |
| 2012/0140524 A1* | 6/2012 | Manabe et al. .................. 363/17 |
| 2013/0235631 A1* | 9/2013 | Pahlevaninezhad et al. .. 363/126 |
| 2013/0257394 A1* | 10/2013 | Wang ............................ 323/234 |
| 2014/0009978 A1* | 1/2014 | Brinlee et al. ................... 363/25 |
| 2014/0152208 A1* | 6/2014 | Jeong et al. .................. 318/400.3 |
| 2014/0160815 A1* | 6/2014 | Jeong et al. ...................... 363/84 |

FOREIGN PATENT DOCUMENTS

| | | |
|---|---|---|
| CN | 202034915 U | 11/2011 |
| KR | 1999-0078273 A | 10/1999 |

\* cited by examiner a4 —————————————
high
FIG. 12A
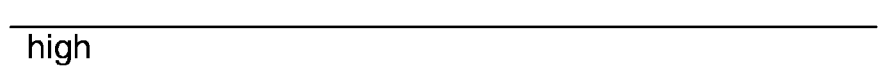
FIG. 12B
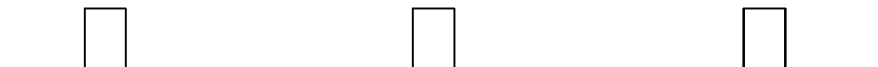
FIG. 12C

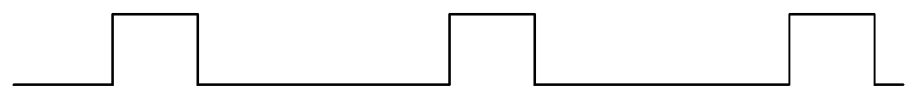
FIG. 13A
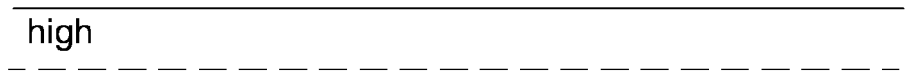
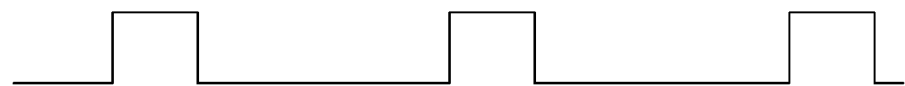
FIG. 13B
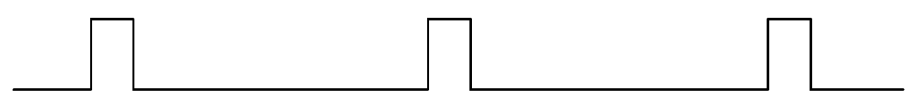
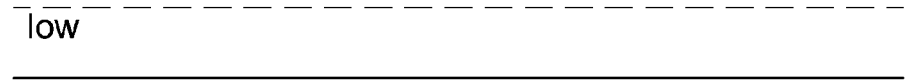
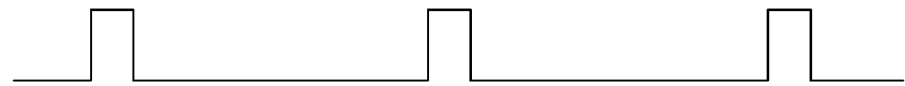
FIG. 13C

DRIVER DEVICE FOR POWER FACTOR CORRECTION CIRCUIT

CROSS-REFERENCE TO RELATED APPLICATION

This application claims the benefit of Korean Patent Application No. 10-2012-0140169 filed on Dec. 5, 2012, with the Korean Intellectual Property Office, the disclosure of which is incorporated herein by reference.

BACKGROUND

The present disclosure relates to a driver device for a bridgeless power factor correction circuit.

Recently, governments in many countries have instituted energy efficiency policies and have encouraged their populations to use energy effectively. Effective energy use is important, especially in electronic devices and home appliances.

Accordingly, improved circuits for effective energy use are being employed in power supplies in electronic devices, home appliances and the like.

Examples of such improved circuits include a power factor correction circuit that adjusts a phase difference between currents and voltages (power factor) of input power by switching input power to effectively transmit the power to a rear stage.

Typically, power factor correction circuits may be divided into passive type circuits and active type circuits.

Passive type circuits use inductors or capacitors to correct a power factor but have limited effects especially in a single-phase.

Active type circuits use a boost type topology and perform switching with a combination of inductors and switching elements to correct a power factor. Active type circuits are not easy to apply to middle or large capacity power supplies since they have relatively low efficiency and high internal currents, voltage ripples and EMI noise problems.

In particular, active-type power factor correction circuits have switching loss generated during the switching of input power.

Therefore, required is a power factor correction circuit with improved switching efficiency, and a driver device for such a power factor correction circuit becomes necessary.

Patent Document 1 relates to a pulse width control circuit, but does not disclose any feature to drive a circuit with improved switching efficiency at the time of power conversion.

RELATED ART DOCUMENT (Patent Document 1) Korean Patent Laid-Open Publication No. 1999-0078273

SUMMARY

An aspect of the present disclosure may provide a driver device for a power factor correction circuit which reduces switching loss generated at the time of switching for power factor correction by way of allowing surplus voltage to flow to a ground before the switching.

An aspect of the present disclosure may also provide a driver device for a power factor correction circuit which reduces an EMI noise level.

According to an aspect of the present disclosure, a driver device, for a power factor correction circuit, which includes first and second main switches that are switched on and off with a phase difference therebetween, and first and second auxiliary switches that provide conduction paths of surplus voltage in the first and second main switches before the first and second main switches are switched on, may include: an input unit receiving a plurality of input signals; and an output unit outputting a first control signal for the first main switch, a second control signal for the second main switch, a third control signal for the first auxiliary switch, and a fourth control signal for the second auxiliary switch based on the plurality of input signals.

The input unit may receive first and second input signals.

One of the first and second input signals may be a pulse width modulation (PWM) signal, and the remaining signal may be a high signal.

The driver device may further include a PWM selecting unit selectively passing a PWM signal based on the first and second input signals, the PWM signal being a first internal signal.

The driver device may further include a pulse generating unit outputting a second internal signal having a phase delayed with regard to a phase of the first internal signal and a third internal signal having a delayed phase and a reduced pulse width with regard to the first internal signal.

The phase of the second internal signal may be delayed with regard to that of the third internal signal.

The driver device may further include a checking unit outputting a fourth internal signal including input signal information based on the first and second input signals.

The checking unit may output a high signal in the case that the first input signal is a PWM signal, and output a low signal in the case that the second input signal is a PWM signal.

The driver device may further include: a main signal generating unit outputting first and second control signals based on the second and fourth internal signals.

The main signal generating unit, in the case that the fourth internal signal is a high signal, may output the second internal signal as the first control signal and the high signal as the second control signal.

The main signal generating unit, in the case that the fourth internal signal is a low signal, may output a high signal as the first control signal and the second internal signal as the second control signal.

The main signal generating unit may further include an auxiliary signals generating unit outputting third and fourth control signals based on the third and fourth internal signals.

The auxiliary signal generating unit, in the case that the fourth internal signal is a high signal, may output the third internal signal as the third control signal and a low signal as the fourth control signal.

The auxiliary signal generating unit, in the case that the fourth internal signal is a low signal, may output a low signal as the third control signal and the third internal signal as the fourth control signal.

According to another aspect of the present disclosure, a driver device for a power factor correction circuit may include: a PWM selecting unit selecting one of a plurality of input signals to output a first internal signal; a pulse generating unit outputting a second internal signal having a phase delayed with regard to a phase of the first internal signal and a third internal signal having a delayed phase and a reduced pulse width with regard to the first internal signal based on the first internal signal output from the PWM selecting unit; a checking unit outputting a fourth internal signal including information on input signals based on the plurality of input signals; a main signal generating unit outputting a first control signal for a first main switch and a second control signal for a second main switch based on the second and fourth internal signals; and an auxiliary signal generating unit outputting a third control signal for a first auxiliary switch and a fourth control signal for a second auxiliary switch based on the third and fourth internal signals.

The plurality of input signals may include first and second input signals, wherein one of the first and second input signals is a pulse width modulation (PWM) signal, and the remaining signal is a high signal.

The first internal signal may be a PWM signal.

The phase of the second internal signal may be delayed with regard to that of the third internal signal.

The checking unit may output a high signal in the case that the first input signal is a PWM signal, and output a low signal in the case that the second input signal is a PWM signal.

The main signal generating unit, in the case that the fourth internal signal is a high signal, may output the second internal signal as the first control signal and the high signal as the second control signal.

The main signal generating unit, in the case that the fourth internal signal is a low signal, may output a high signal as the first control signal and the second internal signal as the second control signal.

The auxiliary signal generating unit, in the case that the fourth internal signal is a high signal, may output the third internal signal as the third control signal and a low signal as the fourth control signal.

The auxiliary signal generating unit, in the case that the fourth internal signal is a low signal, may output a low signal as the third control signal and the third internal signal as the fourth control signal.

BRIEF DESCRIPTION OF DRAWINGS

The above and other aspects, features and other advantages of the present disclosure will be more clearly understood from the following detailed description taken in conjunction with the accompanying drawings, in which:

FIGS. 12A~C and 13A~C are diagrams showing waveforms input to and output from the main signal generating unit and the auxiliary signal generating unit.

DETAILED DESCRIPTION

Figure 1:
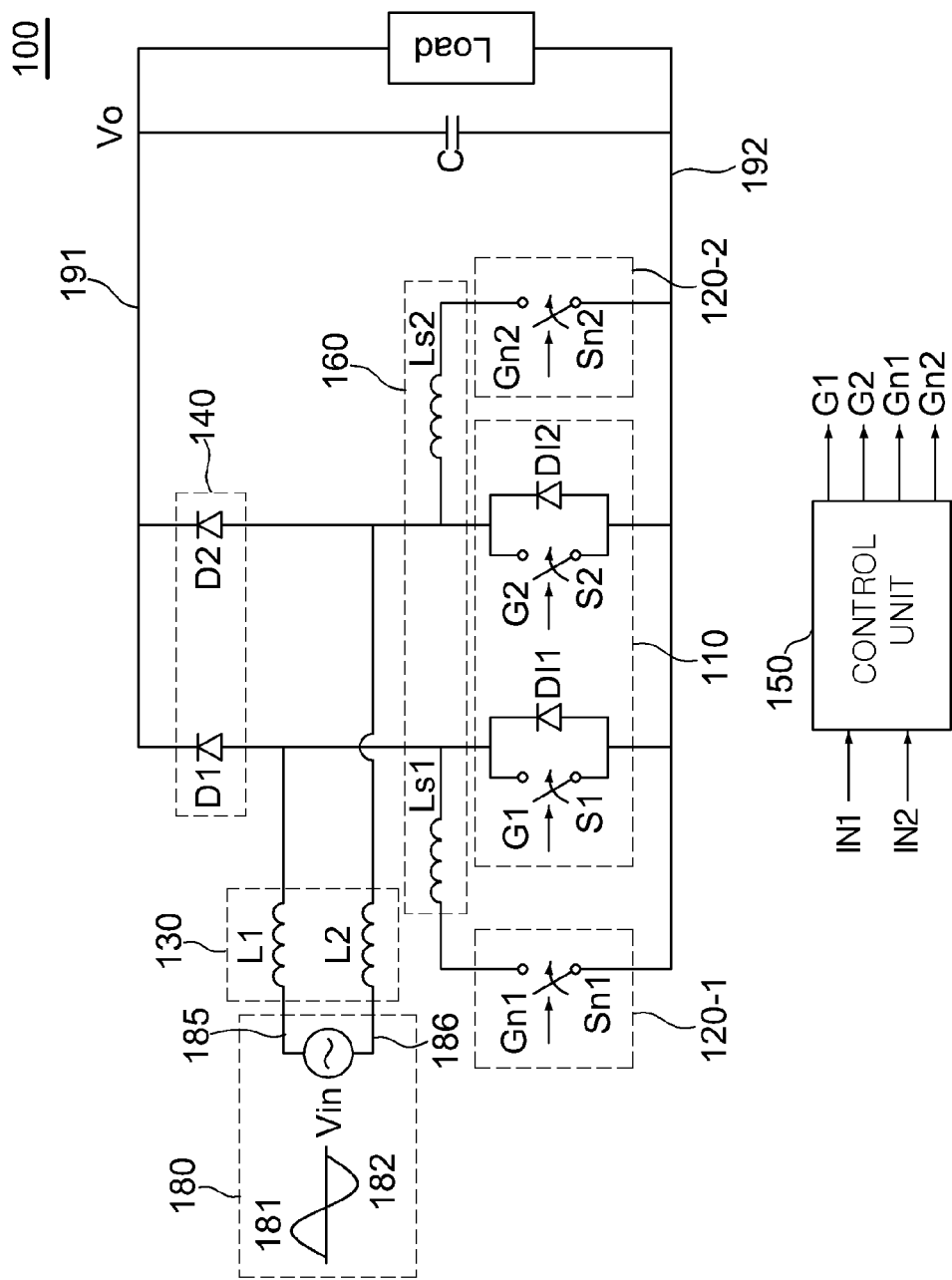
FIGS. 1 and 2 are diagrams illustrating a power factor correction circuit 100 according to an exemplary embodiment of the present disclosure.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

Figure 2:
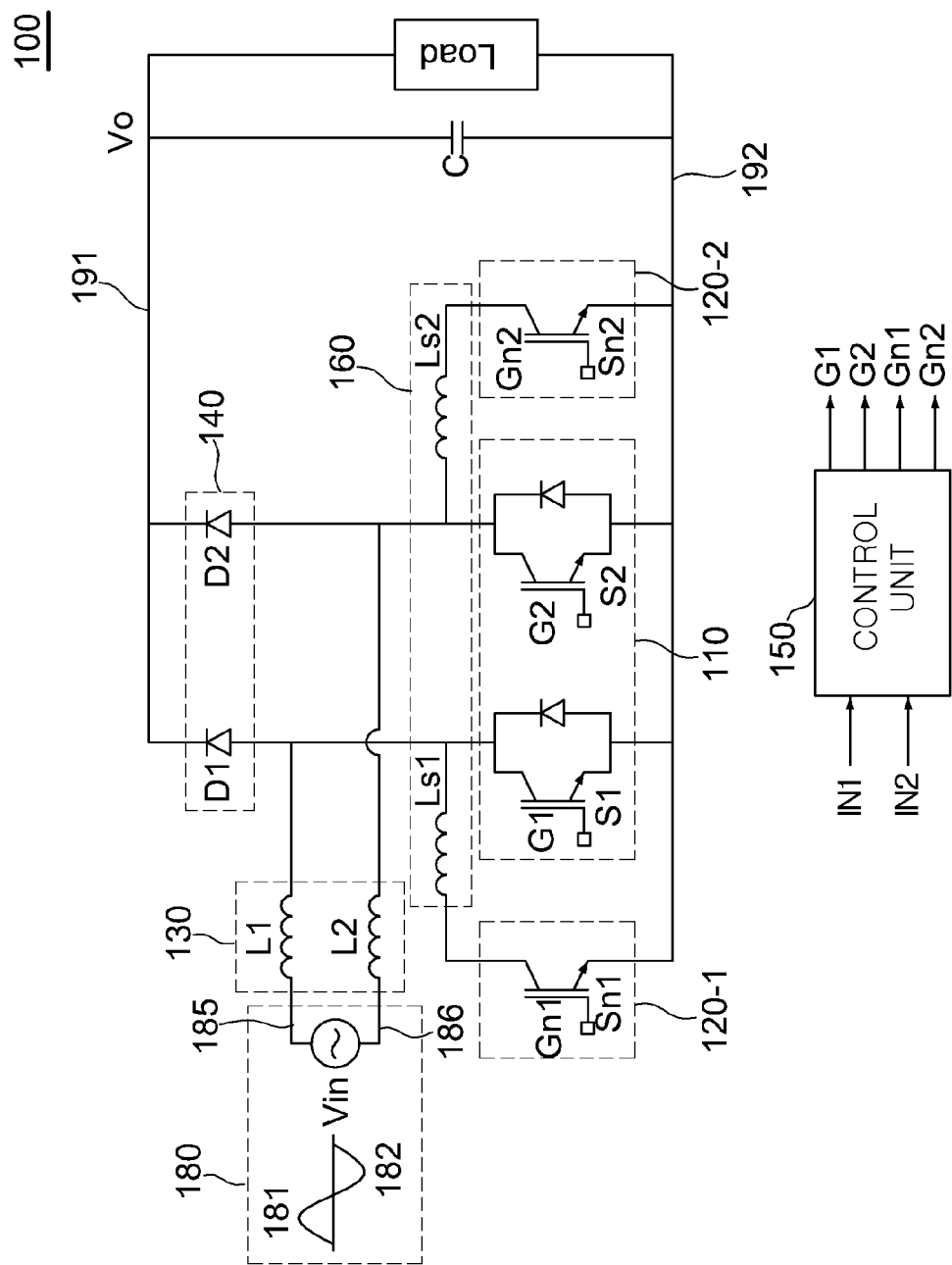

FIGS. 1 and 2 are diagrams illustrating a power factor correction circuit 100 according to an exemplary embodiment of the present disclosure.

Referring to FIG. 1, the power factor correction circuit 100 may include a power supply 180, a main switch unit 110, an auxiliary switch unit 120, an inductor unit 130, an auxiliary inductor unit 160, and a diode unit 140. Herein, one terminal of the power supply is referred to as a first input line 185 and the other terminal of the power supply is referred to as a second input line 186. Further, one terminal of the power factor correction circuit 100 that is connected to a load is referred to as a first output line 191, and the other terminal of the power factor correction circuit 100 that is connected to the load is referred to as a second output line 192.

The main switch unit 110 may include first and second main switches S1 and S2 that are switched on and off with a predetermined phase difference therebetween so as to improve a power factor of an input power. As shown in FIG. 1, the first main switch S1 may be connected between the connection node of a first inductor L1 and a first diode D1 and the second output line 192. Further, the second main switch S2 may be connected between the connection node of a second inductor L2 and a second diode D2 and the second output line 192.

The first and second main switches S1 and S2 may be switched on and off with a phase difference of 180° therebetween.

In this connection, the input power may be supplied from the power supply 180. Further, the power supply 180 may supply an alternating current signal.

Further, the main switch unit 110 may include a first reverse protection diode DI1 and a second reverse protection diode DI2. The first reverse protection diode DI1 may prevent a reverse current from the first main switch S1. The second reverse protection diode DI2 may prevent a reverse current from the second main switch S2.

In the case that the first and second main switches S1 and S2 are configured as transistors, the first and second reverse protection diodes DI1 and DI2 may be diodes provided on the bodies. However, they are not limited thereto but may be separately provided.

The inductor unit 130 may be connected between the power supply 180 supplying an input power and the main switch unit 110 so as to store or release energy depending on switching of the main switch unit 110. Specifically, the inductor unit 130 may include the first inductor L1 and the second inductor L2. The first inductor L1 may be connected between the first input line 185 and the first main switch S1. The second inductor L2 may be connected between the second input line 186 and the second main switch S2.

The diode unit 140 may provide paths through which voltage released from the inductor unit 130 passes depending on switching of the main switch unit 110. Specifically, the diode unit 140 may include the first diode D1 and the second diode D2. The first diode D1 may be connected between the first inductor L1 and the first output line 191. The second diode D2 may be connected between the second inductor L2 and the first output line 191.

The first diode D1 may provide a path along which voltage released from the first inductor L1 passes depending on switching of the first main switch S1. The second diode D2 may provide a path along which voltage released from the second inductor L2 passes depending on switching of the second main switch S2.

Since it is important to provide accurate conduction paths in synchronization with the switching on and off of the first and second main switches S1 and S2, the first and second diodes D1 and D2 need to have good characteristics. For example, the first and second diodes D1 and D2 may include a fast recovery diode (FRD) which exhibits good reverse recovery characteristics.

A capacitor C may be connected between the output terminals in parallel to the load and may stabilize a voltage output from the diode unit 140.

The auxiliary switch unit 120 may produce a conduction path along which a surplus voltage is delivered before the main switch unit 110 is switched on.

The auxiliary switch unit 120 may include a first auxiliary switch Sn1 and a second auxiliary switch Sn2. The first auxiliary switch Sn1 may be connected to the first main switch S1 in parallel. The second auxiliary switch Sn2 may be connected to the second main switch S2 in parallel.

The first auxiliary switch Sn1 may provide a conduction path along which a surplus voltage, if any, is delivered before the first main switch S1 is switched on. Further, the second auxiliary switch Sn2 may provide a conduction path along which a surplus voltage, if any, is delivered before the second main switch S2 is switched on.

The auxiliary inductor unit 160 may adjust the amount of currents flowing through the auxiliary switch unit 120 upon the auxiliary switch unit 120 being switched on and off.

The auxiliary inductor unit 160 may include a first auxiliary inductor Ls1 and a second auxiliary inductor Ls2. The first auxiliary inductor Ls1 may be connected to the first main switch S1 in parallel. Further, the first auxiliary inductor Ls1 may be connected in series with the first auxiliary switch Sn1. That is to say, the first auxiliary inductor Ls1 may be connected between the connection node of the first main switch S1 and the first inductor L1 and the first auxiliary switch Sn1. Further, the second auxiliary inductor Ls2 may be connected to the second main switch S2 in parallel. The second auxiliary inductor Ls2 may be connected in series with the second auxiliary switch Sn2. That is to say, the second auxiliary inductor Ls2 may be connected between the connection node of the second main switch S2 and the second inductor L2 and the second auxiliary switch Sn2.

The control unit 150 may provide switching control signals G1, G2, Gn1, and Gn2 to control the switching of the first main switch S1, the second main switch S2, the first auxiliary switch Sn1, and the second auxiliary switch Sn2.

The control unit 150 may be implemented as a separate integrated circuit (IC).

The control unit 150 may output the switching control signals G1, G2, Gn1, and Gn2 based on the first and second input signals IN1 and IN2. A specific manner in which the control unit 150 acquires the switching control signals will be described in detail later in the specification.

The first main switch S1, the second main switch S2, the first auxiliary switch Sn1, and the second auxiliary switch Sn2 according to the exemplary embodiment may be configured as one of an insulated gate bipolar transistor (IGBT), a metal oxide semiconductor field-effect transistor (MOSFET) and a bipolar junction transistor (BJT). In the example of FIG. 2, they are configured as BJTs, but exemplary embodiments of the present disclosure are not limited thereto.

The main switch unit of the power factor correction circuit 100 improves a power factor such that it is switched on and off to adjust a phase difference between voltage and current of an input power. The auxiliary switch unit 120 may provide a conduction path of surplus voltage before the switching of the main switch unit 110.

First, the operation of a bridgeless power factor correction circuit, except for the operation of the auxiliary switch unit Sn1 and Sn2, will be described. The operation of the auxiliary switch unit Sn1 and Sn2 will be described in detail with reference to FIGS. 4 to 7.

The power supply 180 repeats positive half cycles 181 and negative half cycles 182 to generate an alternating voltage. During the positive half cycles 181, currents flow through the first inductor L1. At this time, in the case that the first main switch S1 is turned on, currents may flow through the first main switch S1, the second main switch S2 and the second inductor L2 and may return back to the power supply 180. During this, the first inductor L1 may maintain a charged state in which energy is increased. On the contrary, in the case that the first main switch S1 is turned off, the first inductor L1 may be in a discharged state in which energy is decreased, and currents may flow to the load through the first diode D1. While the power supply 180 is in the positive half cycles 181, conduction loss arises only by the first switch S1 but not by the second switch S2.

Next, during the negative half cycles 182, currents flow through the second inductor L2. At this time, in the case that the second main switch S2 is turned on, currents may flow through the second main switch S2, the first main switch S1 and the first inductor L1 and may return back to the power supply 180. During this, the second inductor L2 may maintain a charged state in which energy is increased. On the contrary, in the case that the second main switch S2 is turned off, the second inductor L2 may be in a discharged state in which energy is decreased, and currents may flow to the load through the second diode D2. While the power supply 180 is in the negative half cycles 182, conduction loss arises only by the second switch S2 but not by the first switch S1.

Figure 3:
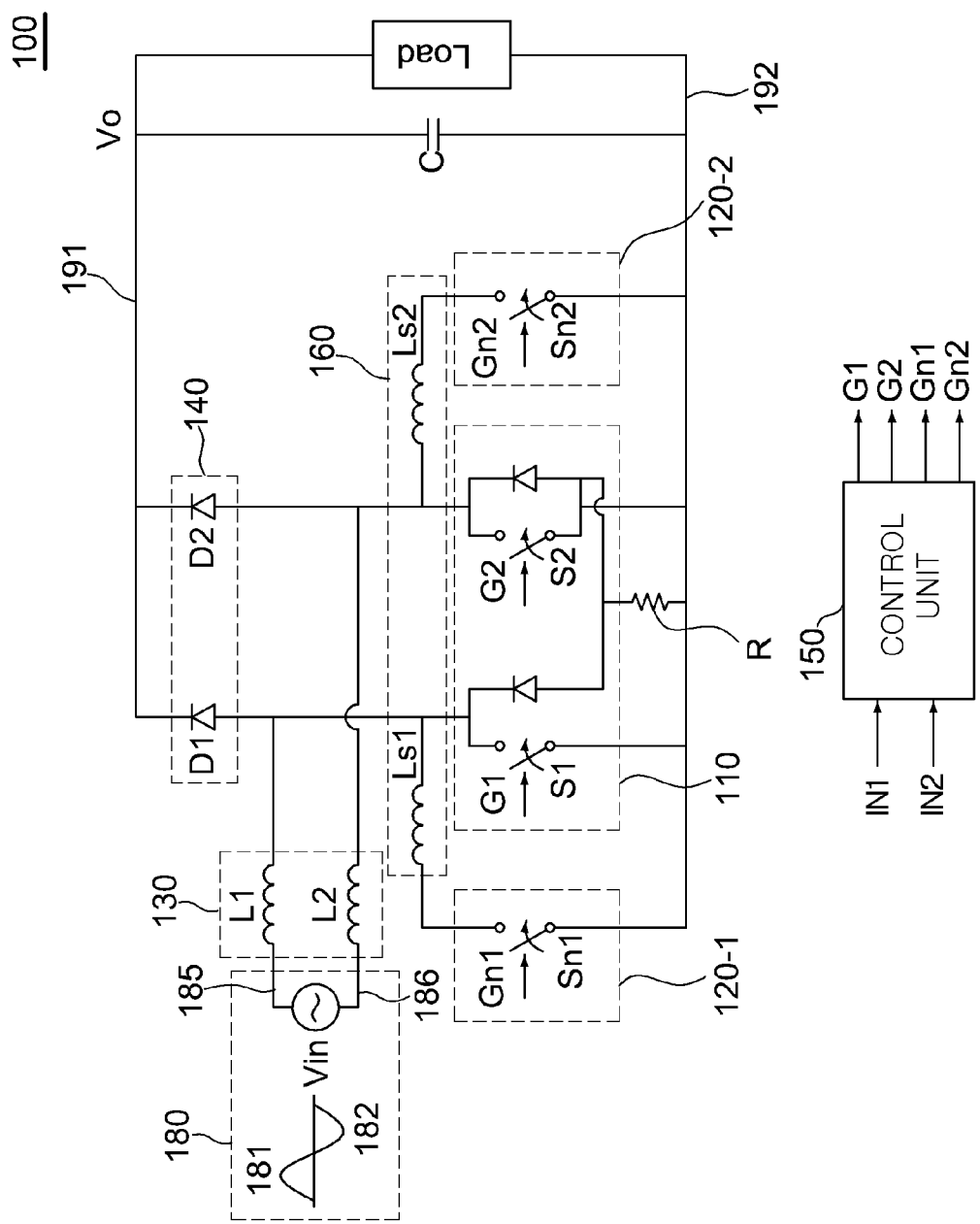
FIG. 3 is a diagram illustrating a power factor correction circuit according to another exemplary embodiment of the present disclosure.

FIG. 3 is a diagram illustrating a power factor correction circuit according to another exemplary embodiment of the present disclosure.

Referring to FIG. 3, the power factor correction circuit 100 may further include a resistor R to detect an input line current. Specifically, one terminal of the resistor R may be connected to anodes of the first reverse protection diode DI1 and the second reverse protection diode DI2. In addition, the other terminal of the resistor R may be connected to the second output line 192.

Other configurations than the resistor R are identical to those shown in FIGS. 1 and 2, and thus detailed descriptions thereof will not be repeated.

Figure 4:
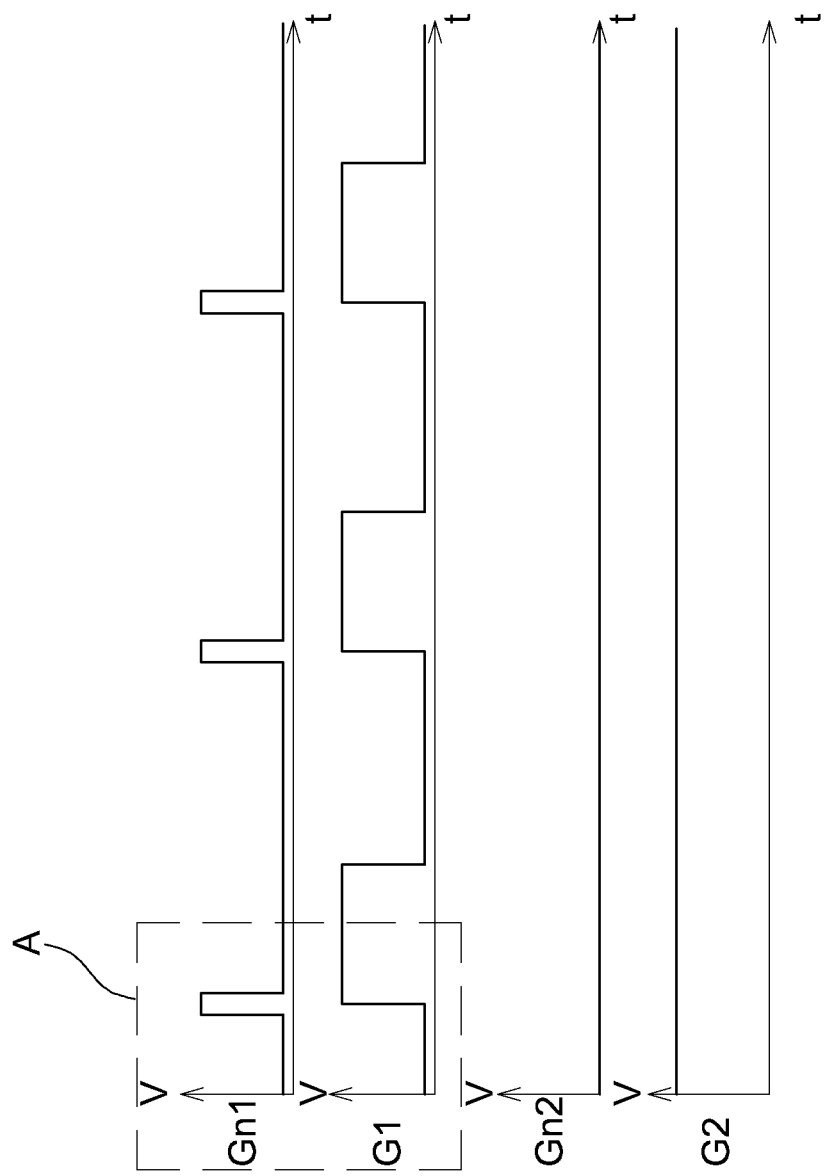
FIG. 4 is a graph of switching control signals for a main switch unit and an auxiliary switch unit employed in a power factor correction circuit according to an exemplary embodiment of the present disclosure when a power supply is in positive half cycles.
Figure 5:
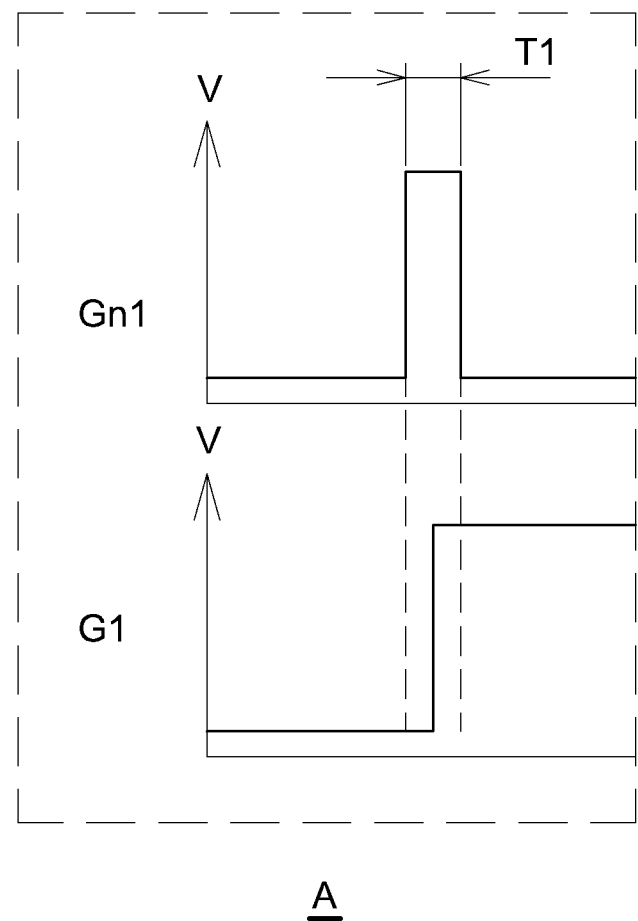
FIG. 5 is an enlarged diagram of part A of FIG. 4.

FIG. 4 is a graph of switching control signals for the main switch unit 110 and the auxiliary switch unit 120 employed in the power factor correction circuit 100 when the power supply is in the positive half cycles, and FIG. 5 is an enlarged diagram of part A of FIG. 4.

Referring to FIGS. 1, 4 and 5, while the power supply 180 is in the positive half cycles 181, the control unit 150 may apply a high signal G2 to the second main switch S2. Further, the control unit 150 may apply a low signal Gn2 to the second auxiliary switch Sn2.

That is, according to an exemplary embodiment, while the power supply 180 is in the positive half cycles 181, the second main switch S2 is in the on-state, and the second auxiliary switch Sn2 may be in the off-state.

In addition, referring to FIGS. 1, 4 and 5, the auxiliary switch unit 120 of the power factor correction circuit 100 according to the exemplary embodiment may provide a conduction path of surplus voltage before the main switch unit 110 is switched on. In other words, a zero-voltage switching condition in the main switch unit 110 is provided so as to remove switching loss.

Specifically, in order to provide a conduction path of surplus voltage, the control unit 150 may transmit switching control signals G1 and Gn1 to switch on the first auxiliary switch Sn1 before the first switch S1 is switched on. When the switching control signals are high signals, the switches S1 and Sn1 are turned on, and when the switching control signals are low signals, the switches S1 and Sn1 are turned off.

Specifically, the first auxiliary switch Sn1 may provide a conduction path along which a surplus voltage, if any, is delivered before the first main switch S1 is switched on.

To this end, as shown in FIGS. 4 and 5, the first auxiliary switch Sn1 may be switched on before the first main switch S1 is switched on and may be switched off before the first main switch S1 is switched off. This may be referred to as a "first switching operation."

Incidentally, while the first auxiliary switch Sn1 may provide the conduction path of surplus voltage of the first main switch S1 to reduce switching loss of the first main switch S1, switching loss of the first auxiliary switch Sn1 may arise.

In other words, when the first auxiliary switch Sn1 is switched off, a peak voltage due to a transient voltage may be generated across the first auxiliary switch Sn1 to result in switching loss.

To solve this problem, referring to FIG. 1, the first auxiliary inductor Ls1 that adjusts the amount of currents flowing through the first auxiliary switch Sn1 when the first auxiliary switch Sn1 of the power factor correction circuit is switched on and off may be further included.

Incidentally, referring to FIG. 5, the width of the control signal Gn1 for the first auxiliary switch Sn1 may be adjusted as appropriate.

For example, the pulse width T1 of the control signal Gn1 may be determined so that a zero-voltage switching condition occurs in the first main switch S1.

Further, in the case that a current flowing through the first diode D1 becomes larger, the pulse width T1 of the control signals Gn1 may be widened so as to reduce spike voltages generated when the first auxiliary switch Sn1 is turned off. This is because currents flowing when the first auxiliary switch Sn1 is turned off may be reduced by widening the pulse width T1 of the control signal Gn1.

In addition, in the case that the inductance of the first auxiliary inductor Ls1 is increased, since reverse recovery currents of the first diode D1 are reduced, the pulse width T1 of the control signal Gn1 may be reduced so that zero-voltage switching of the first main switch S1 is carried out in a shorter time.

Moreover, in the case that the switching frequencies of the control signals (G1 and Gn1) are increased, the pulse width T1 of the control signal Gn1 may be reduced so that distortions in the control signals are prevented and conduction loss of the first auxiliary switch Sn1 generated while the first auxiliary switch Sn1 is turned on is reduced.

As described above, according to an exemplary embodiment of the present disclosure, the first main switch S1 is operated in a zero-voltage switching condition, and thus switching loss of the first main switch S1 may be reduced.

Further, by doing so, efficiency of a power factor correction circuit may be significantly improved.

Figure 6:
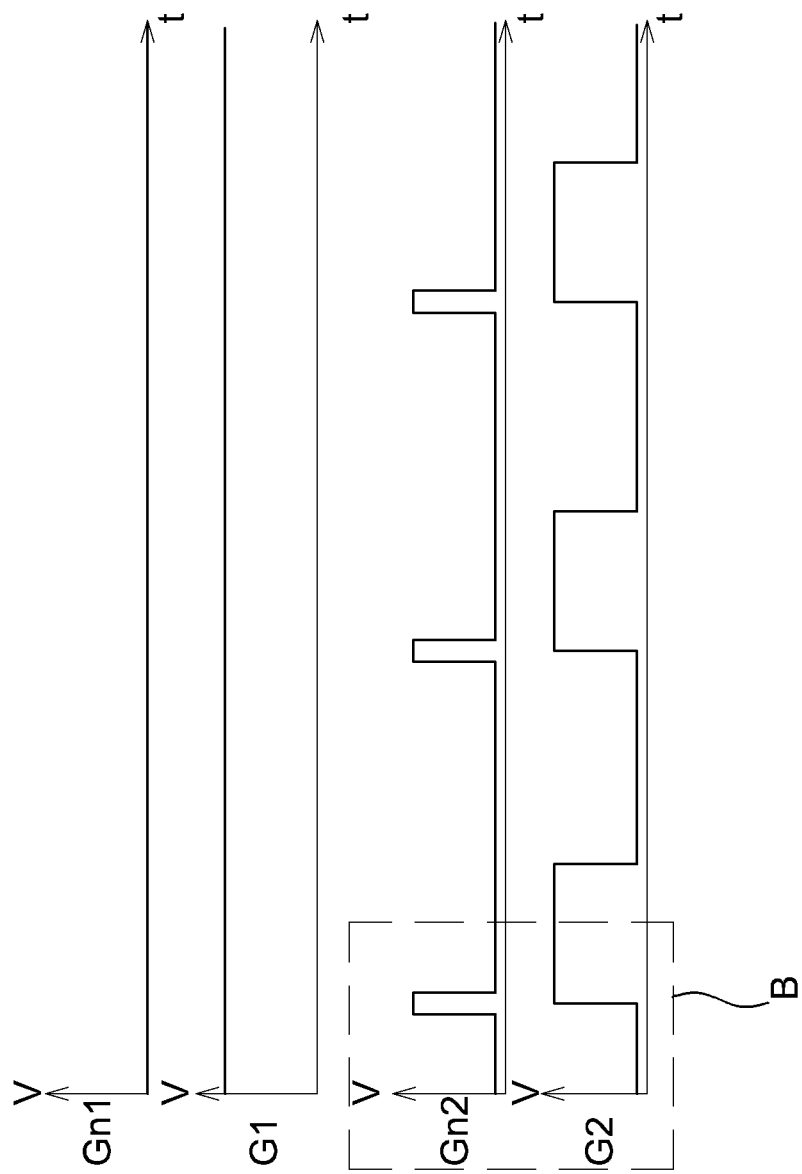
FIG. 6 is a graph of switching control signals for a main switch unit and an auxiliary switch unit employed in a power factor correction circuit according to an exemplary embodiment of the present disclosure when a power supply is in negative half cycles.
Figure 7:
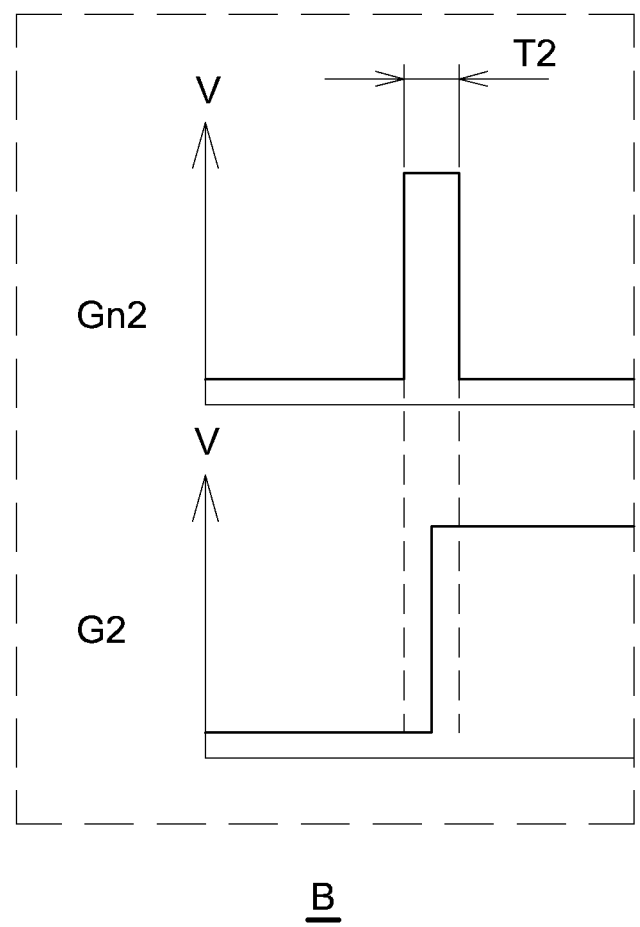
FIG. 7 is an enlarged diagram of part B of FIG. 6.

FIG. 6 is a graph of switching control signals for the main switch unit 110 and the auxiliary switch unit 120 employed in the power factor correction circuit 100 when the power supply is in the negative half cycles, and FIG. 7 is an enlarged diagram of part B of FIG. 6.

Referring to FIGS. 1, 6 and 7, while the power supply 180 is in the negative half cycles 182, the control unit 150 may apply a high signal G1 to the first main switch S1. Further, the control unit 150 may apply a low signal Gn1 to the first auxiliary switch Sn1.

That is, according to an exemplary embodiment, while the power supply 180 is in the negative half cycles 182, the first main switch S1 is in the on-state, and the first auxiliary switch Sn1 may be in the off-state.

In addition, referring to FIGS. 1, 6 and 7, the auxiliary switch unit 120 of the power factor correction circuit 100 according to the exemplary embodiment may provide a conduction path of surplus voltage before the main switch unit 110 is switched on. In other words, a zero-voltage switching condition in the main switch unit 110 is provided so as to remove switching loss.

Specifically, in order to provide a conduction path of surplus voltage, the control unit 150 may transmit switching control signals G2 and Gn2 to switch on the second auxiliary switch Sn2 before the second switch S2 is switched on. When the switching control signals are high signals, the switches S2 and Sn2 are turned on, and when the switching control signals are low signals, the switches S2 and Sn2 are turned off.

Specifically, the second auxiliary switch Sn2 may provide a conduction path along which a surplus voltage, if any, is delivered before the second main switch S2 is switched on.

To this end, as shown in FIGS. 6 and 7, the second auxiliary switch Sn2 may be switched on before the second main switch S2 is switched on and may be switched off before the second main switch S2 is switched off. This may be referred to as a "second switching operation."

Incidentally, although the second auxiliary switch Sn2 may provide the conduction path of surplus voltage of the second main switch S2 to reduce switching loss of the second main switch S2, switching loss of the second auxiliary switch Sn2 may arise.

In other words, when the second auxiliary switch Sn2 is switched off, a peak voltage due to a transient voltage may be generated across the second auxiliary switch Sn2 to result in switching loss.

To solve this problem, referring to FIG. 1, the second auxiliary inductor Ls2 may be further included that adjusts the amount of currents flowing through the second auxiliary switch Sn2 when the second auxiliary switch Sn2 of the power factor correction circuit is switched on and off.

Further, referring to FIG. 7, the width of the control signal Gn2 for the second auxiliary switch Sn2 may be adjusted as appropriate.

For example, the pulse width T2 of the control signal Gn2 may be determined so that a zero-voltage switching condition occurs in the second main switch S2.

Further, in the case that a current flowing through the second diode D2 becomes larger, the pulse width T2 of the control signal Gn2 may be widened so as to reduce spike voltages generated when the second auxiliary switch Sn2 is turned off. This is because currents flowing when the second auxiliary switch Sn2 is turned off may be reduced by widening the pulse width T2 of the control signal Gn2.

In addition, in the case that the inductance of the second auxiliary inductor Ls2 is increased, since reverse recovery currents of the second diode D2 reduce, the pulse width T2 of the control signal Gn2 may be reduced so that zero-voltage switching of the second main switch S2 is carried out in a shorter time.

Moreover, in the case that the switching frequencies of the control signals G2 and Gn2 are increased, the pulse width T2 of the control signal Gn2 may be reduced so that distortions in the control signals are prevented and conduction loss of the second auxiliary switch Sn2 generated while the second auxiliary switch Sn2 is turned on is reduced.

As described above, according to an exemplary embodiment of the present disclosure, the second main switch S2 is operated in a zero-voltage switching condition, and thus switching loss of the second main switch S2 may be reduced. Further, by doing so, efficiency of a power factor correction circuit may be significantly improved.

Figure 8:
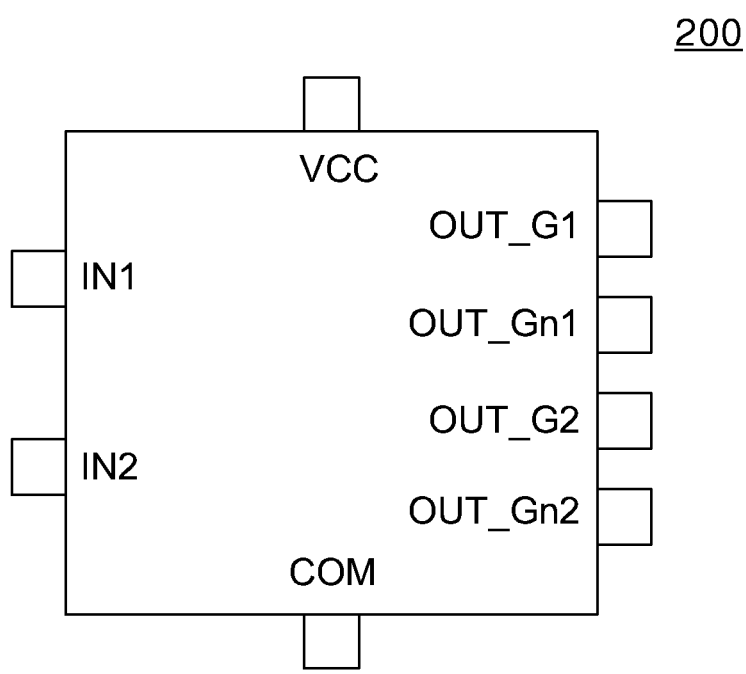
FIG. 8 is a diagram illustrating a driver device according to an exemplary embodiment of the present disclosure.

FIG. 8 is a diagram illustrating a driver device according to an exemplary embodiment of the present disclosure.

As described above, the control unit 150 may provide switching control signals G1, G2, Gn1, and Gn2 to control the switching of the first main switch S1, the second main switch S2, the first auxiliary switch Sn1, and the second auxiliary switch Sn2.

The control unit 150 may be implemented as a separate integrated circuit (IC). Further, the control unit 150 may be implemented as a separate driver device.

Herein, for the sake of convenience of description, a switching control signal for driving the first main switch S1 is referred to as a first control signal G1. Further, a switching control signal for driving the second main switch S2 is referred to as a second control signal G2. Further, a switching control signal for driving the first auxiliary switch Sn1 is referred to as a third control signal Gn1. Further, a switching control signal for driving the second auxiliary switch Sn2 is referred to as a fourth control signal Gn2.

Referring to FIG. 8, the driver device 200 may be implemented as an IC.

Further, the driver device 200 may include a first input IN1 to receive a first input signal, and a second input IN2 to receive a second input signal. Further, the driver device 200 may include a first output OUT_G1 to output the first control signal, a second output OUT_G2 to output the second control signal, a third output OUT_Gn1 to output the third control signal, and a fourth output OUT_Gn2 to output the fourth control signal. Further, the driver device 200 may include a terminal Vcc to receive a power supply voltage and a terminal COM to be connected to ground.

Figure 9:
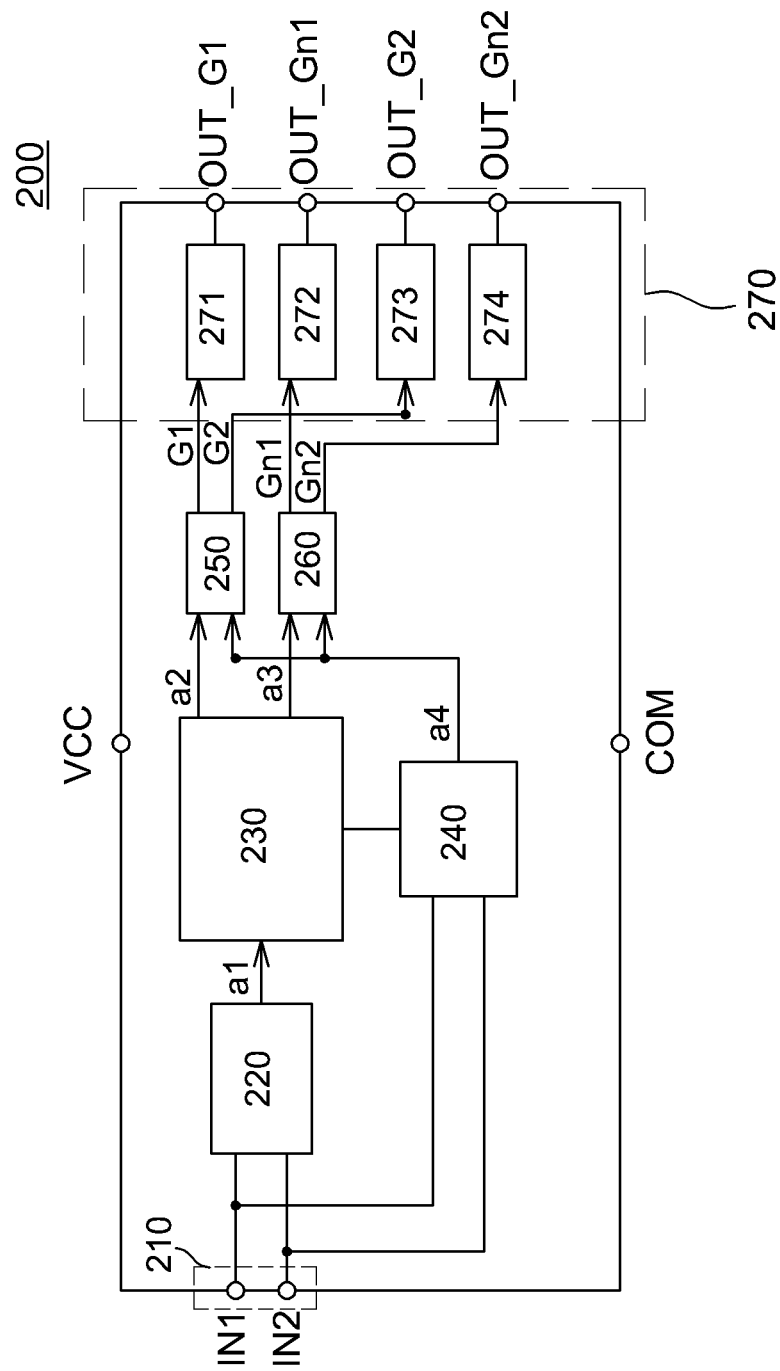
FIG. 9 is a block diagram of a driving device according to an exemplary embodiment of the present disclosure.

FIG. 9 is a block diagram of a driver device according to an exemplary embodiment of the present disclosure.

Referring to FIG. 9, the driver device 200 may include an input unit 210, a pulse width modulation (PWM) selecting unit 220, a pulse generating unit 230, a checking unit 240, a main signal generating unit 250, an auxiliary signal generating unit 260, and an output unit 270.

The input unit 210 may receive a plurality of input signals. The input unit 210 may include a first input and a second input. The first input may receive the first input signal IN1. The second input may receive the second input signal IN2.

One of the first and second input signals IN1 and IN2 may be a pulse width modulation (PWM) signal, and the remaining signal may be a high signal.

Herein, a high signal may turn on a switching element. Further, a low signal may turn off a switching element.

The PWM selecting unit 220 may output a first internal signal a1 based on the first and second input signals IN1 and IN2. For example, the PWM selecting unit 220 may select a PWM signal from the first and second input signals IN1 and IN2 to pass it. Therefore, the first internal signal a1 may be a PWM signal.

Figure 10A:
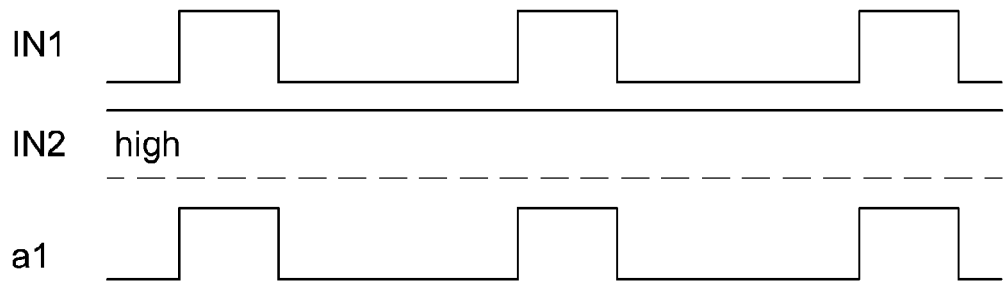
FIGS. 10 A and B are diagrams showing waveforms input to and output from a PWM selecting unit.
Figure 10B:
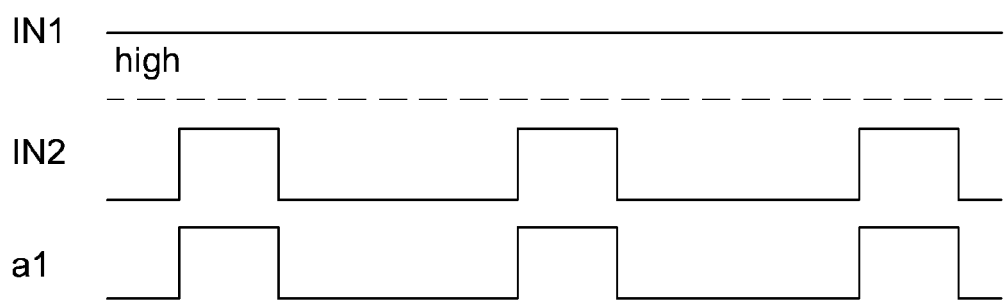

FIGS. 10A and 10B are a diagram showing waveforms input to and output from the PWM selecting unit.

Referring to FIG. 10A, the first input signal IN1 may be a PWM signal, and the second input signal IN2 may be a high signal. The PWM selecting unit 220 may receive the first input signal IN1 and the second input signal IN2 and may output the first internal signal a1. The first internal signal a1 may be identical to the first input signal IN1.

Referring to FIG. 10B, the first input signal IN1 may be a high signal, and the second input signal IN2 may be a PWM signal. The PWM selecting unit 220 may receive the first input signal IN1 and the second input signal IN2 and may output the first internal signal a1. The first internal signal a1 may be identical to the second input signal IN2.

The pulse generating unit 230 may output a second internal signal a2 having a delayed phase with regard to the first internal signal a1 based on the first internal signal a1. Further, the pulse generating unit 230 may output a third internal signal a3 having a delayed phase and a reduced pulse width with regard to the first internal signal a1 based on the first internal signal a1. The second internal signal a2 may have a phase delayed more with regard to that of the third internal signal a3.

Figure 11:
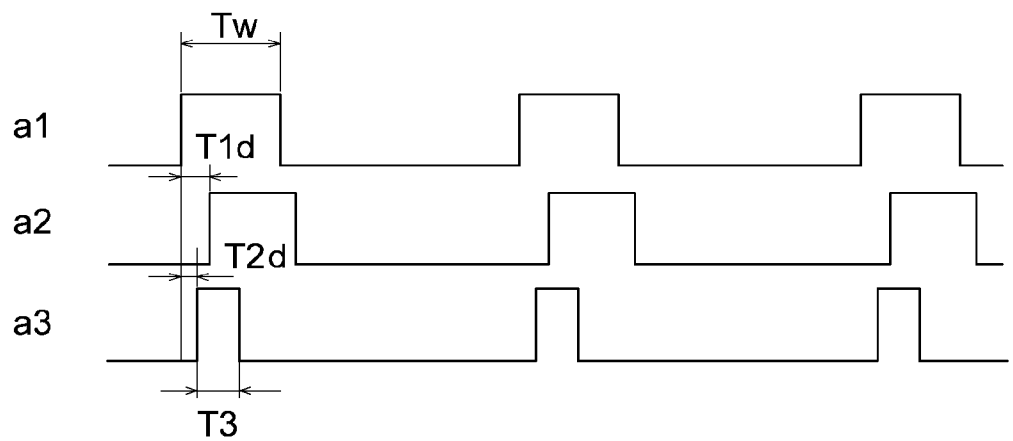
FIG. 11 is a diagram showing waveforms input to and output from a pulse generating unit.

FIG. 11 is a diagram showing waveforms input to and output from the pulse generating unit.

Referring to FIG. 11, the pulse generating unit 230 may receive the first internal signal a1 having a predetermined pulse width Tw.

The pulse generating unit 230 may output the second internal signal a2 having a delayed phase with regard to the phase of the first internal signal a1. Herein, the width of the delayed phase of the second internal signal a2 is referred to as T1d.

Further, the pulse generating unit 230 may output the third internal signal a3 having a delayed phase and reduced pulse width with regard to the phase and pulse width of the first internal signal a1. Herein, the width of the delayed phase of the third internal signal a3 is referred to as T2d. Further, the pulse width of the third internal signal a3 is referred to as T3.

The width T1d of the delayed phase of the second internal signal a2 may be larger than the width T2d of the delayed phase of the third internal signal a3. Further, the pulse width T3 of the third internal signal a3 may be smaller than the pulse width Tw of the first internal signal a1.

The checking unit 240 may output a fourth internal signal a4 including input signal information based on the first and second input signals IN1 and IN2.

The input signal information may indicate which of the first and second input signals is a PWM signal. For example, in the case that the first input signal is a PWM signal, the checking unit 240 may output a high signal. Further, in the case that the second input signal is a PWM signal, the checking unit 240 may output a low signal.

FIGS. 12 and 13 are diagrams showing waveforms input to and output from the main signal generating unit and the auxiliary signal generating unit.

According to an exemplary embodiment of the present disclosure, the main signal generating unit 250 may output the first and second control signals G1 and G2 based on the second and fourth internal signals a2 and a4.

Referring to FIG. 12, in the case that the fourth internal signal a4 is a high signal, the main signal generating unit 250 may output the second internal signal a2 as the first control signal G1 and may output the high signal as the second control signal G2.

Referring to FIG. 13, in the case that the fourth internal signal a4 is a low signal, the main signal generating unit 250 may output a high signal as the first control signal G1 and may output the second internal signal a2 as the second control signal G2.

According to an exemplary embodiment of the present disclosure, the auxiliary signal generating unit 260 may output the third and fourth control signals Gn1 and Gn2 based on the third and fourth internal signals a3 and a4.

Referring to FIG. 12, in the case that the fourth internal signal is a high signal, the auxiliary signal generating unit 260 may output the third internal signal a3 as the third control signal Gn1 and may output a low signal as the fourth control signal Gn2.

Referring to FIG. 13, in the case that the fourth internal signal is a low signal, the auxiliary signal generating unit 260 may output the low signal as the third control signal Gn1 and may output the third internal signal a3 as the fourth control signal Gn2.

The first to fourth control signals G1, G2, Gn1 and Gn2 shown in FIG. 12 are identical to those shown in FIG. 4.

That is, according to the above-described method, the driver device 200 may output switching control signals applied during the positive half cycles of the power supply.

In addition, the first to fourth control signals G1, G2, Gn1 and Gn2 shown in FIG. 13 are identical to those shown in FIG. 6.

That is, according to the above-described method, the driver device 200 may output switching control signals applied during the negative half cycles of the power supply.

Further, the output unit 270 may output the first to fourth control signals G1, G2, Gn1 and Gn2.

The output unit 270 may include first to fourth output elements 271 to 274.

The first output element 271 may transmit the first control signal G1 to the first output OUT_G1. The third output element 272 may transmit the third control signal Gn1 to the third output OUT_Gn1. The second output element 273 may transmit the second control signal G2 to the second output OUT_G2. The fourth output element 274 may transmit the fourth control signal Gn2 to the fourth output OUT_Gn2.

As set forth above, according to exemplary embodiments of the present disclosure, switching loss generated at the time of switching for power factor correction may be reduced by way of allowing surplus voltage to flow to ground before the switching.

Further, according to exemplary embodiments of the present disclosure, an EMI noise level may be reduced.

While exemplary embodiments have been shown and described above, it will be apparent to those skilled in the art that modifications and variations could be made without departing from the spirit and scope of the present disclosure as defined by the appended claims.

What is claimed is:

1. A driver device for a power factor correction circuit including first and second main switches that are switched on and off with a phase difference there between, and first and second auxiliary switches that provide conduction paths of surplus voltage in the first and second main switches before the first and second main switches are switched on, the driver device comprising:
    an input unit receiving a plurality of input signals wherein the input unit receives first and second input signals;
    an output unit outputting a first control signal for the first main switch, a second control signal for the second main switch, a third control signal for the first auxiliary switch, and a fourth control signal for the second auxiliary switch based on a plurality of input signals
    a PWM selecting unit selectively passing a PWM signal based on the first and second input signals, the PWM signal being a first internal signal
    a pulse generating unit outputting a second internal signal having a phase delayed with regard to a phase of the first internal signal and a third internal signal having a delayed phase and a reduced pulse width with regard to the first internal signal based on the first internal signals wherein the phase of the second internal signal is delayed with regard to that of the third internal signal
    a checking unit outputting a fourth internal signal including input signal information based on the first and second input signals wherein the checking unit outputs a high signal in the case that the first input signal is a PWM signal, and outputs a low signal in the case that the second input signal is a PWM signal
    a main signal generating unit outputting first and second control signals based on the second and fourth internal signals wherein the main signal generating unit, in the case that the fourth internal signal is a high signal, outputs the second internal signal as the first control signal and the high signal as the second control signal.

2. The driver device of claim 1, wherein one of the first and second input signals is a pulse width modulation (PWM) signal, and the remaining signal is a high signal.

3. The driver device of claim 1, wherein the main signal generating unit, in the case that the fourth internal signal is a low signal, outputs a high signal as the first control signal and the second internal signal as the second control signal.

4. The driver device of claim 1, further comprising an auxiliary signal generating unit outputting third and fourth control signals based on the third and fourth internal signals.

5. The driver device of claim 4, wherein the auxiliary signal generating unit, in the case that the fourth internal signal is a high signal, outputs the third internal signal as the third control signal and a low signal as the fourth control signal.

6. The driver device of claim 4, wherein the auxiliary signal generating unit, in the case that the fourth internal signal is a low signal, outputs the low signal as the third control signal and the third internal signal as the fourth control signal.

7. A driver device for a power factor correction circuit, comprising:
    a PWM selecting unit selecting one of a plurality of input signals to output a first internal signal;
    a pulse generating unit outputting a second internal signal having a phase delayed with regard to a phase of the first internal signal and a third internal signal having a delayed phase and a reduced pulse width with regard to the first internal signal based on the first internal signal output from the PWM selecting unit;
    a checking unit outputting a fourth internal signal including information on input signals based on the plurality of input signals;
    a main signal generating unit outputting a first control signal for a first main switch and a second control signal for a second main switch based on the second and fourth internal signals; and
    an auxiliary signal generating unit outputting a third control signal for a first auxiliary switch and a fourth control signal for a second auxiliary switch based on the third and fourth internal signals.

8. The driver device of claim 7, wherein the plurality of input signals includes first and second input signals, wherein one of the first and second input signals is a pulse width modulation (PWM) signal, and the remaining signal is a high signal.

9. The driver device of claim 8, wherein the checking unit outputs a high signal in the case that the first input signal is a PWM signal, and outputs a low signal in the case that the second input signal is a PWM signal.

10. The driver device of claim 7, wherein the first internal signal is a PWM signal.

11. The driver device of claim 7, wherein a phase of the second internal signal is delayed with regard to that of the third internal signal.

12. The driver device of claim 7, wherein the main signal generating unit, in the case that the fourth internal signal is a high signal, outputs the second internal signal as the first control signal and the high signal as the second control signal.

13. The driver device of claim 7, wherein the main signal generating unit, in the case that the fourth internal signal is a low signal, outputs a high signal as the first control signal and the second internal signal as the second control signal.

14. The driver device of claim 7, wherein the auxiliary signal generating unit, in the case that the fourth internal signal is a high signal, outputs the third internal signal as the third control signal and a low signal as the fourth control signal.

15. The driver device of claim 7, wherein the auxiliary signal generating unit, in the case that the fourth internal signal is a low signal, outputs the low signal as the third control signal and the third internal signal as the fourth control signal.

* * * * *